(12) United States Patent
Young

(10) Patent No.: US 6,803,879 B1
(45) Date of Patent: Oct. 12, 2004

(54) CORRECTION DATA SIGNAL DIPLEXING ONTO THE AM BAND

(75) Inventor: David Young, Santa Cruz, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/456,896

(22) Filed: Dec. 7, 1999

(51) Int. Cl.[7] .............................................. H04B 7/185
(52) U.S. Cl. ............................ 342/357.02; 342/357.01
(58) Field of Search ...................... 342/357.01, 357.02, 342/357.13; 701/213, 215; 380/255, 258, 270

(56) References Cited

U.S. PATENT DOCUMENTS

| | | | | |
|---|---|---|---|---|
| 4,630,058 A | * | 12/1986 | Brown | ........................ 342/359 |
| 5,463,656 A | * | 10/1995 | Polivka et al. | ............... 375/200 |
| 5,477,228 A | | 12/1995 | Tiwari | ......................... 342/357 |
| 5,739,786 A | * | 4/1998 | Greenspan et al. | ......... 342/357 |
| 5,754,657 A | * | 5/1998 | Schipper et al. | ............... 380/25 |
| 6,035,039 A | * | 3/2000 | Tisdale et al. | ................. 380/23 |
| 6,167,137 A | * | 12/2000 | Marino et al. | .............. 380/255 |

* cited by examiner

*Primary Examiner*—Dao Phan (57) ABSTRACT

A method and apparatus for generating signals that can be used for accurately determining position and a method and apparatus for accurately determining position. A radio station modification unit is disclosed that can be incorporated into an existing radio transmission facility. The radio station modification unit generates a correction data signal that can be used by position determining systems for accurately determining position. In one embodiment, the radio station modification unit generates correction data that is encrypted. A position determination system decrypts the correction data upon receiving an activation instruction and uses the correction data to accurately determine position.

29 Claims, 7 Drawing Sheets

CORRECTION DATA SIGNAL DIPLEXING ONTO THE AM BAND

TECHNICAL FIELD

This invention relates to position determination systems. Specifically, the present invention relates to an apparatus and method for generating and transmitting signals that are used for accurately determining position and a method and apparatus for determining position.

BACKGROUND ART

The U.S. Department of Defense has developed a Global Positioning System (GPS) that consists of a constellation of orbiting satellites that transmit a GPS signal. The GPS signal includes a P-code, a C/A code, and a GPS navigation message that are used by receivers for determining position. More particularly, P-codes and the GPS navigation message are used by authorized users (e.g. the U.S. military) for determining position while C/A codes and the GPS navigation message are used by civilians for determining position. The GPS navigation signals commonly available to civilian users are referred to as the standard positioning service (SPS).

Use of the GPS for precision agriculture, surveying, construction, vehicle location, etc. has grown in recent years. However, many applications require a higher accuracy than is available using the SPS. More particularly, atmospheric conditions introduce error into the position determination process. Also, the U.S. Air Force intentionally introduces error into the transmitted ephemerides and clock.

Reference stations, typically referred to as differential GPS (DGPS) reference stations, transmit correction data that can be used for accurately determining position. These reference stations are typically dedicated facilities with permanent and extensive broadcast capabilities. Each reference station transmits either their calculated corrections to the GPS signals or their actual observations of the GPS signals (raw data), or both.

One method for obtaining accurate position that compensates for intentionally induced error and error due to atmospheric conditions is known as Differential GPS (DGPS). DGPS position determination systems use calculated corrections to the GPS data broadcast from a reference station to accurately determine position. The calculated corrections to the GPS data that is used for determining position using DGPS techniques is commonly referred to as code phase correction data.

More recently, Real Time Kinematic (RTK) systems have been developed that use carrier phase techniques for accurately determining position. More particularly, each RTK position determination system receives the observations of the GPS signal and removes errors associated with atmospherics and satellite timing/clock errors at the RTK system. To accommodate RTK systems, some reference stations now transmit observations of the GPS signals (raw data) for each satellite which is used by RTK systems for accurately determining position. The observations of the GPS signals that are used for determining position using RTK techniques are commonly referred to as carrier phase observable data.

Many reference stations broadcast correction data that conforms to the Radio Technical Commission for Maritime services (RTCM) standard. The RTCM standard includes format standards, communication bands, and messages for a differential correction GPS service. The US Coast Guard operates and maintains regional reference stations that calculate and broadcast correction data that complies with the RTCM standards. The RTCM correction data broadcast by some US Coast Guard reference stations includes carrier phase observable data for position determination using RTK methods while data broadcast by other facilities only includes only code phase correction data. However, irrespective of whether the particular US Coast Guard facility broadcasts carrier phase data or code phase correction data, the broadcast is typically in a standard RTCM format.

Though there are many reference stations dedicated to serving the maritime industry, many coastal areas do not have a nearby reference station. Also, few inland areas are covered by a reference station. Therefore, there is a need for reference stations that broadcast correction data, particularly in inland areas.

As use of the GPS for precision agriculture, surveying, construction, vehicle location, etc. has grown, the need for reference stations that broadcast correction data has grown. However, reference stations that transmit correction data are expensive to build. Land must be acquired, a building or buildings must be erected, and a radio tower must be constructed. Then, power must be provided to the site and the necessary electronics equipment must be installed. Also, the facility must be maintained and in many cases continually manned.

What is needed is a method and apparatus for providing widely available correction signals that can be used by position determination systems for determining position. This method and apparatus should be compatible with current GPS receivers. Also, a method and apparatus is needed that uses correction signals for accurately determining position. The present invention provides a solution to the above needs.

DISCLOSURE OF THE INVENTION

The present invention provides a method and apparatus for providing widely available correction signals that can be used by position determination systems for determining position. This method and apparatus is compatible with current GPS receivers Also, the present invention provides a method and apparatus that uses the correction signals for accurately determining position.

In one embodiment of the present invention, a radio station modification unit is described that includes a beacon signal generator and a diplexer that is electrically coupled to the beacon signal generator. The beacon signal generator produces a signal that includes correction data. The radio station modification unit is designed to be incorporated into an existing radio transmission facility such as, for example an AM radio station.

In one embodiment of the present invention, the radio station modification unit is installed in an existing AM radio station by placing the beacon signal generator in a location where position determining signals such as, for example, signals from the US Global Positioning System (GPS) can be received. The diplexer is then coupled to the AM radio station's transmitter and is connected to the AM radio station's antenna. The diplexer outputs the radio station's AM signal and a second signal, hereinafter referred to as a correction data signal. The AM signal and the correction data signal are radiated by the AM radio station's antenna.

The AM signal is radiated at the same frequency that the radio station was using prior to the installation of the radio station modification unit. Therefore, the apparatus and method of the present invention does not significantly alter the station's AM signal. Thus, other than the inconvenience of installation, there is no interference with the operation of the AM radio station. However, a slight power degradation may result. In one embodiment, the correction data signal is radiated at a frequency in the range of 200 to 400 kilohertz. In the present embodiment, a frequency of 300 kilohertz (300 kHz) is used.

The correction data signal includes correction data that can be used by users having properly equipped position determination systems for accurately determining position. Because many existing DGPS equipped and RTK equipped position determination systems are designed to receive correction data signals in the 300 kHz frequency band, by transmitting the correction data signal in the 300 kHz frequency band, no modification to existing position determination systems is required.

By integrating the radio station modification unit of the present invention with an existing radio transmission facility such as an existing AM radio station, a correction data signal is easily and inexpensively provided. Moreover, because existing radio transmission facilities such as AM radio stations are used, there is no need to construct a dedicated building and radio tower as is required in the prior art.

AM radio stations are numerous and AM radio stations are located in many regions that require accurate position determination. Therefore, by combining the radio station modification unit of the present invention with these existing AM radio stations, correction data signals can be received in numerous regions that now do not have access to correction data.

In one embodiment of the present invention, users of correction data are charged based on usage. Radio signals are broadcast that include correction data that is encrypted from an existing radio station. Upon payment by a user for use of correction data, an activation instruction is included in the radio signal transmitted from the existing radio station. The activation instruction instructs a particular position determination system to decrypt the encrypted correction data and to use received correction data to accurately determine position. This allows for efficiently and easily charging users based on usage.

In one embodiment, position determination systems that include a radio receiver and that can decrypt received encrypted correction data are provided to users. In the present embodiment, the radio receiver continually monitors one or more frequency to receive correction data signals. The position determination system functions as a standard GPS receiver, determining position using satellites or other available sources of position determination signals until such time that an activation instruction is received. The activation instruction engages the position determination system to accurately determine position using correction data signals.

In one embodiment, as long as the user pays for the use of correction data, the position determination system accurately determines position by decrypting and using correction data signals. Once the user's subscription is over, a deactivation instruction is included in the radio signal broadcast from the existing AM radio station. The deactivation instruction instructs the particular position determination system to discontinue decryption and usage of correction data signals.

These and other objects and advantages of the present invention will no doubt become obvious to those of ordinary skill in the art after having read the following detailed description of the preferred embodiments that are illustrated in various drawing figures.

BRIEF DESCRIPTION OF THE DRAWINGS

The accompanying drawings, that are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "coupling", "calculating", "determining", "including", "activating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 1:
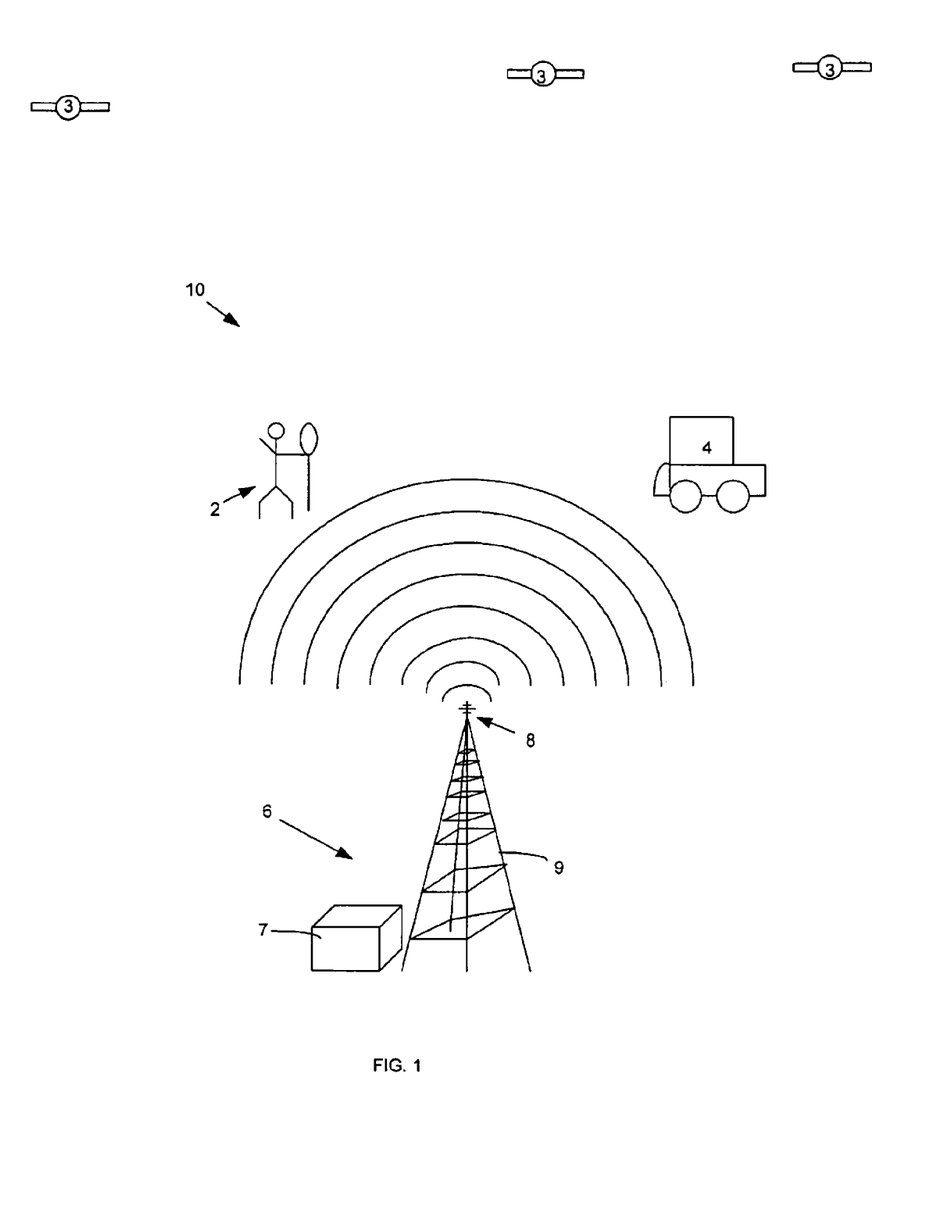
FIG. 1 is a diagram showing a reference station that is transmitting correction data that is received by a surveying device and by a tractor, the position determination systems in the tractor and in the surveying device capable of accurately determining position using signals from satellites and the received correction data in accordance with one embodiment of the present invention.

FIG. 1 shows a system for transmitting correction data signals that includes existing radio station 6. Existing radio station 6 includes building 7 and radio tower 9 that supports antenna 8. In the present embodiment, existing radio station 6 is modified such that existing radio station 6 produces correction data signals. The correction data signals generated by existing radio station 6 are used by, for example, surveyor 2 and tractor 4 for accurately determining position.

Figure 2:
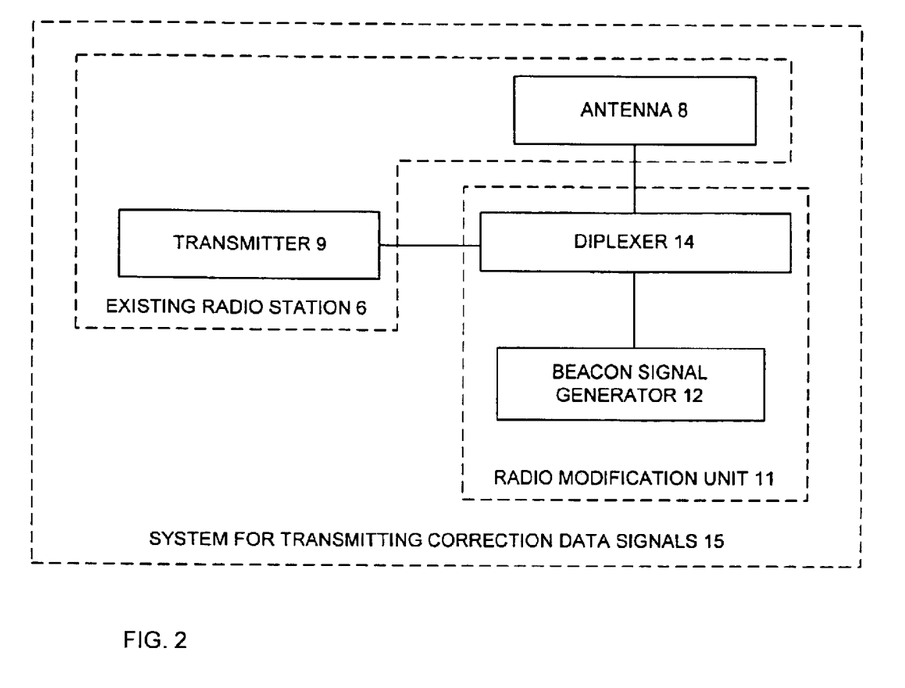
FIG. 2 is a diagram of a system for transmitting correction data signals in accordance with one embodiment of the present claimed invention.

In the embodiment shown in FIG. 2, system for transmitting correction data signals 10 includes radio modification unit 11 that is installed into existing radio station 6. Radio modification unit 11 includes beacon signal generator 12 that is coupled to diplexer 14. Installation is accomplished by coupling diplexer 14 to transmitter 9 and to antenna 8 of existing radio station 6.

Figure 3:
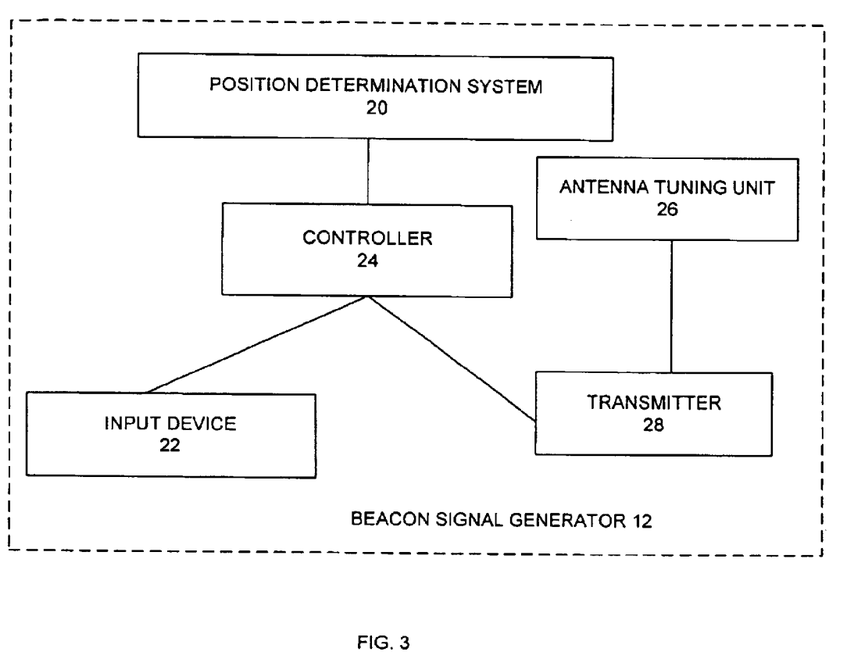
FIG. 3 is a schematic diagram showing components of a beacon signal generator in accordance with one embodiment of the present claimed invention.

FIG. 3 shows an embodiment of beacon signal generator 12 that includes antenna tuning unit 26 and transmitter 28. Antenna tuning unit 26 allows for tuning to accommodate the electrical characteristics of antenna 8. In one embodiment, transmitter 28 generates a signal modulated to a frequency in the range of from 200 KHz to 400 kHz. In the present embodiment, the signal is modulated to the 300 kilohertz signal band. In one embodiment, transmitter 28 transmits at a power level of 1 kilowatt.

Continuing with FIG. 3, beacon signal generator 12 includes position determination system 20. Position determination system 20 determines position and couples data to controller controller 24. In one embodiment, position determination system 20 determines position using signals from satellites of the US global positioning system. In the present embodiment, position determination and error correction system 20 includes a 4000 MSK DGPS receiver and a 4000 IM MSK integrity monitor which are sold by Trimble Navigation, Limited of Sunnyvale, Calif.

Still referring to FIG. 3, controller 24 is coupled to position determination system receiver 20 and is coupled to input device 22 and to transmitter 28. Controller 24 controls the operations of beacon signal generator 12 and is operable to generate position determining correction data. Controller 24 may be a microprocessor, multiple linked microprocessors or a general purpose computing device. In one embodiment, controller 24 is one or more semiconductor device(s) that function as a general purpose computer. In one embodiment, controller 24 is a general purpose microprocessor such as a 68000 series microprocessor made by Motorola, Inc. of Schaumburg, Ill. In the present embodiment, controller 24 is a general purpose microprocessor that operates a beacon control system software package.

Beacon signal generator 12 also includes input device 22 for receiving user input. In the present embodiment, input device 22 is a keyboard that includes an alphanumeric keypad and function keys.

Figure 4:
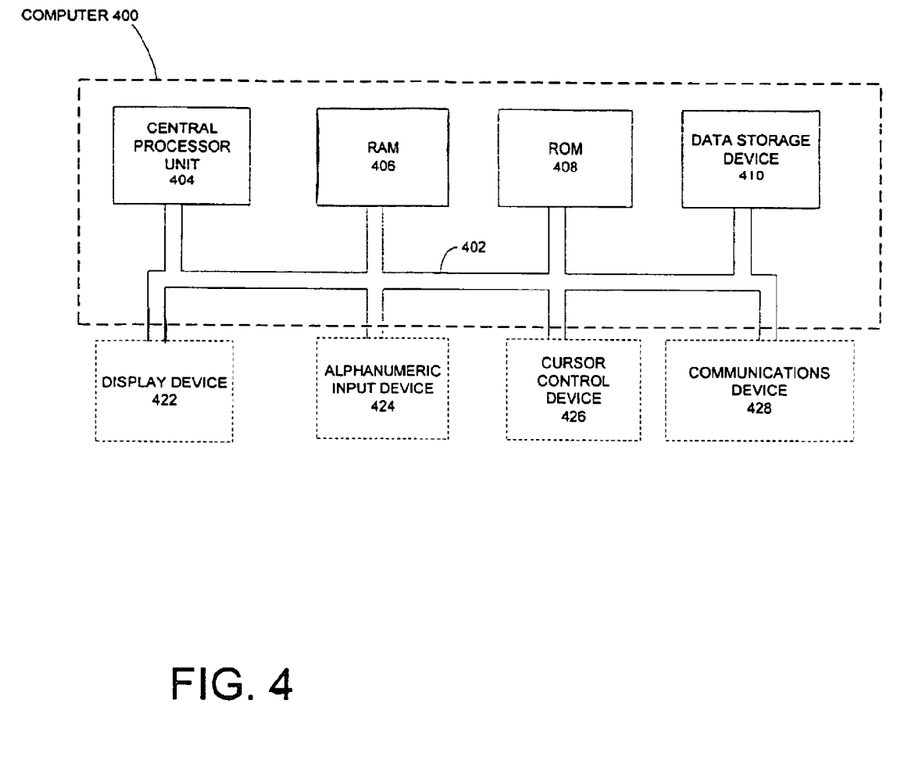
FIG. 4 is a diagram an exemplary computer system in accordance with one embodiment of the present claimed invention.

With reference now to FIG. 4, portions of the system for generating signals that can be used for determining position of the present invention are comprised of computer executable instructions that reside in a computer system. FIG. 4 illustrates an exemplary computer system 4 used as a part of a safety system in accordance with the present invention. It is appreciated that the computer system 400 of FIG. 4 is exemplary only and that the present invention can operate within a number of different computer systems including general-purpose computers systems, embedded computer systems, and stand alone computer systems.

Computer system 400 of FIG. 4 includes an address/data bus 402 for communicating information, a central processor unit 404 coupled to bus 402 for processing information and instructions. Computer system 400 also includes data storage features such as a random access memory (RAM) 406 coupled to bus 402 for storing information and instructions for central processor unit 404, a read only memory (ROM) 408 coupled to bus 402 for storing static information and instructions for the central processor unit 404, and a data storage device 410 (e.g., a magnetic or optical disk and disk drive) coupled to bus 402 for storing information and instructions. A display device 422 is coupled to bus 402 for displaying information to a computer operator. An alphanumeric input device 424 including alphanumeric and function keys is coupled to bus 402 for communicating information and command selections to central processor unit 404.

Display device 422 of FIG. 4, utilized with computer system 400 of the present invention, may be a liquid crystal device, cathode ray tube, or other display device suitable for creating graphic images and alphanumeric characters recognizable to the user. Cursor control device 426 allows the computer user to dynamically signal the two-dimensional movement of a visible symbol (cursor) on a display screen of display device 422. Many implementations of cursor control device 426 are known in the art including a trackball, mouse, touch pad, joystick or special keys on alphanumeric input device 424 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands. Cursor control device 426 is coupled to bus 402 for communicating user input information and command selections to central processor unit 404, and a signal input output communication device 428 (e.g. a modem) coupled to bus 402.

Figure 5:
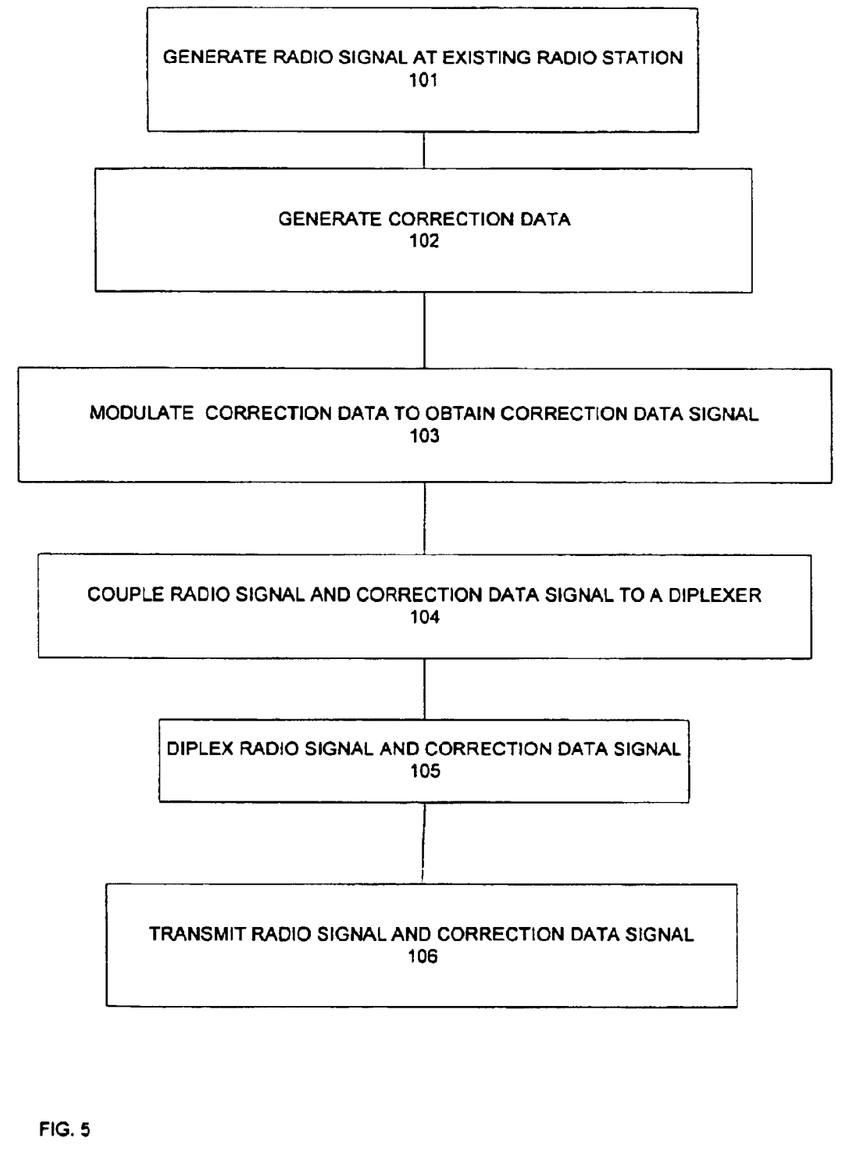
FIG. 5 is a diagram showing a method for generating a signal that can be used for accurately determining position in accordance with one embodiment of the present claimed invention.

Referring now to FIG. 5, a method for generating a signal that can be used to determine position is shown. As shown by step 101, a radio signal is generated at an existing radio station. In one embodiment, the existing radio station is an AM radio station. Alternatively, a FM radio station could be used.

Continuing with FIG. 5, as shown by step 102, correction data is generated. In one embodiment, correction data is generated by first receiving position determining signals. The position indicated by the received position determining signals is then determined and is compared to the actual position of the radio station to obtain differential GPS correction data. Alternatively, the position determining signals are used to generate correction data suitable for real time kinematics applications. In one embodiment of the present invention, beacon signal generator 12 of FIGS. 2–3 is used for generating correction data.

Referring still to FIG. 5, the correction data is modulated to obtain a correction data signal as shown by step 103. In one embodiment, the correction data is modulated to a frequency of between 200 and 400 kilohertz. In the present embodiment, transmitter 28 of FIG. 3 is used to generate a signal at a frequency of 300 kilohertz.

The radio signal and the correction data signal are coupled to a diplexer as shown by step 104 of FIG. 5. The radio signal and the correction data signal are diplexed as shown by step 105. The diplexed radio signal and the correction data signal are then coupled to the radio station's antenna and are transmitted as shown by step 106. In one embodiment, correction data signals and radio signals are coupled to diplexer 14 of FIG. 2 which diplexes the signals and couples the signals to antenna 8 from which the signals are transmitted.

Referring still to FIG. 5, in one embodiment, the correction data signal is transmitted at a power level of 1 kilowatt. The radio signal transmits at the radio station's usual power level and is modulated to the radio station's assigned frequency.

Referring to FIGS. 1–5, in one embodiment, the correction data is encrypted. By encrypting the correction data, only authorized, paying users can use the correction data signal to accurately determine position.

Figure 6:
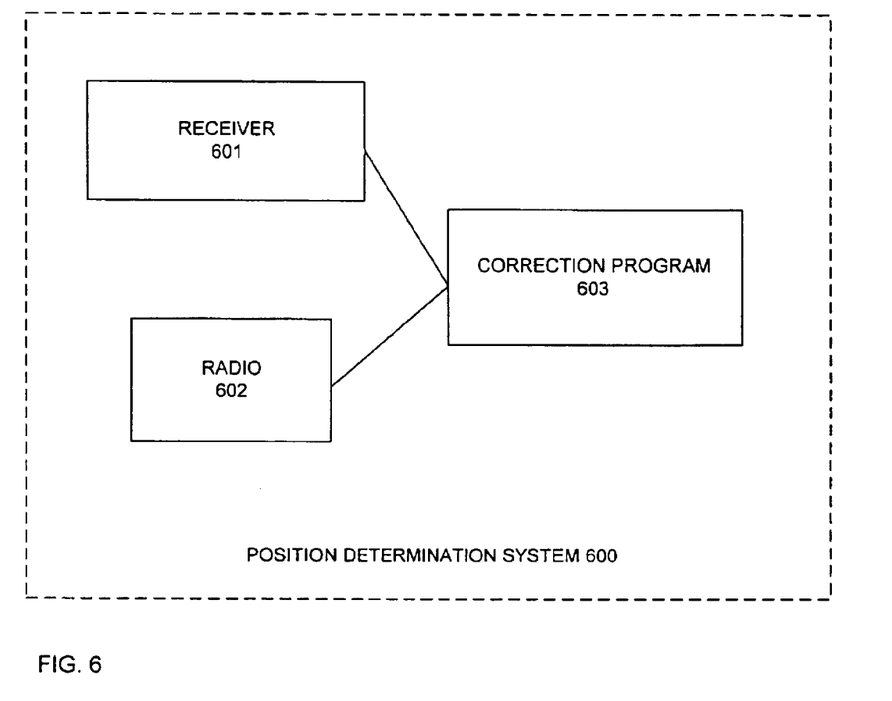
FIG. 6 is a diagram of a position determination system that can be used to accurately determine position in accordance with one embodiment of the present claimed invention.

Referring now to FIG. 6, a position determination system 600 is shown that includes receiver 601, radio 602 and correction program 603. In one embodiment of the present invention, receiver 601 is a GPS receiver adapted to determine position using satellites of the US global positioning system. Receiver 601 can determine position using position determination signals from satellites and can more accurately determine position using correction data. In one embodiment, receiver 601 is a DGPS receiver. Alternatively, receiver 601 is a RTK receiver.

In one embodiment, radio 601 receives correction data signals such as the correction data signals transmitted in the embodiments shown in FIGS. 1–5. In one embodiment, radio 601 monitors transmissions in the frequency range of from 200 to 400 kilohertz. In the present embodiment, radio 601 monitors the 300 kilohertz frequency.

Referring still to FIG. 6, correction program 603 is coupled to receiver 601 and is coupled to radio 602. In one embodiment, correction program 603 is an algorithm programmed into an application specific integrated circuit device (ASIC). Alternatively, correction program 603 is a program adapted to run on a processor such as a Motorola processor. In yet another embodiment, correction program 603 includes executable instructions that are performed by receiver 601. Correction program 603 enables position determination using correction data upon receiving an activation instruction included in said correction data signal.

Continuing with FIG. 6, in one embodiment, receiver 601 determines position using conventional GPS techniques until such time that said correction program 603 is activated.

Upon activation of correction program 603, position is accurately determined. In one embodiment, position is accurately determined using differential global positioning system position determination methods. Alternatively RTK position determination methods are used to accurately determine position.

In one embodiment of the present invention, users of correction data are charged based on usage. Radio signals are broadcast that include correction data that is encrypted from an existing radio station. In one embodiment, a radio signal produced according to the embodiments shown in FIGS. 1–5 is used. Upon payment by a user for use of correction data, an activation instruction is included in the radio signal transmitted from the existing radio station. In the embodiment shown in FIG. 3, input device 22 is used to generate an activation instruction upon payment by a particular user. The activation instruction instructs a particular position determination system to decrypt the encrypted correction data and to use received correction data to accurately determine position.

In one embodiment, position determination systems that include a radio receiver and that can decrypt received encrypted correction data are provided to users. In one embodiment of the present invention, position determination system 600 of FIG. 6 is provided to users.

In one embodiment, as long as the user pays for the use of correction data, the position determination system accurately determines position by decrypting and using correction data signals. Once the user's subscription is over, a deactivation instruction is included in the radio signal broadcast from the existing AM radio station. The deactivation instruction instructs the particular position determination system to discontinue decryption and usage of correction data signals.

Figure 7:
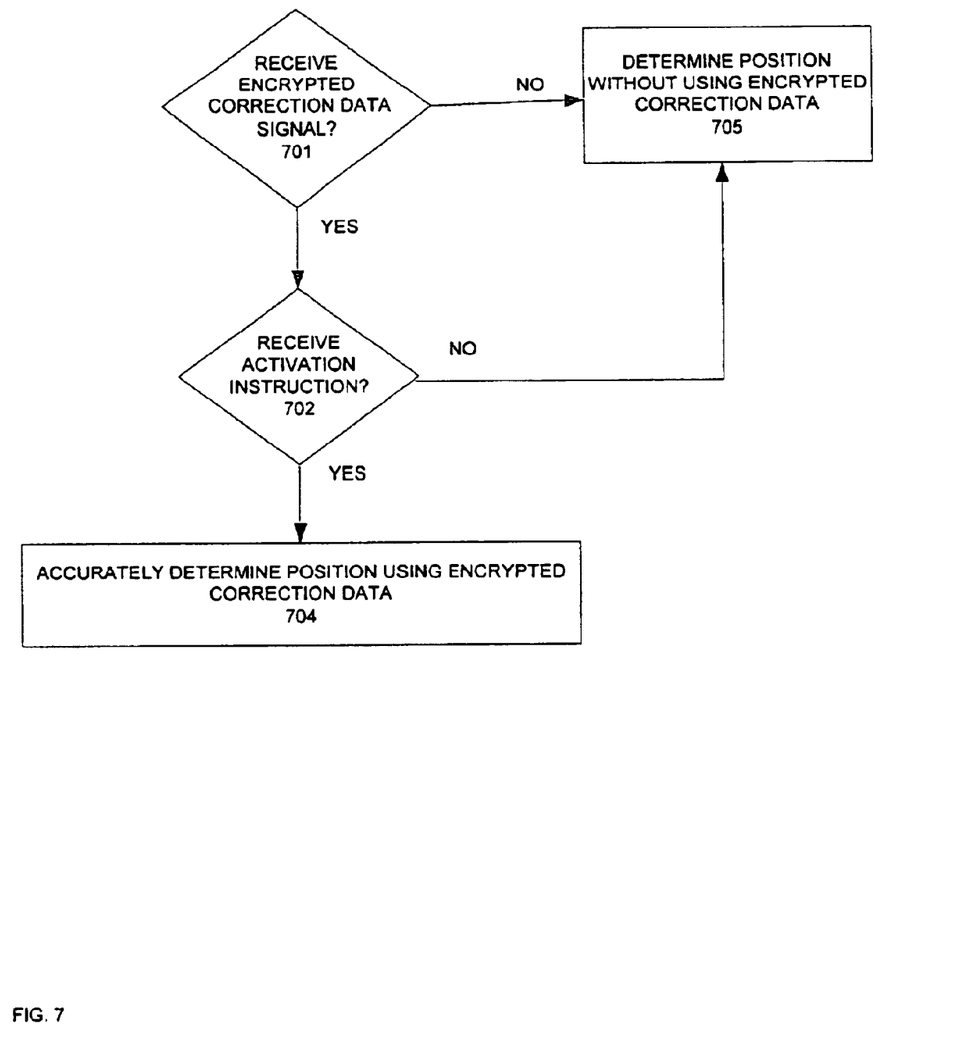
FIG. 7 is a diagram showing a method for accurately determining position in accordance with one embodiment of the present claimed invention.

FIG. 7 shows a method for accurately determining position using encrypted correction data. As shown by blocks 701 and 705 when encrypted correction data signals are not received, position is determined without using the encrypted correction data signals. In the embodiment shown in FIG. 6, radio 602 is used to receive encrypted correction data signals and receiver 601 is operable to determine position when encrypted correction data signals are not received.

As shown by steps 701–702 and 705, when encrypted correction data signals are received position is determined without using the encrypted correction data signals until such time that an activation instruction is received.

In one embodiment, either all or a portion of the encrypted correction data is decrypted in order to determine whether an activation instruction is included in the encrypted correction data signal. In the embodiment shown in FIG. 6, upon receiving an activation instruction, correction program 603 is activated. In one embodiment, an activation instruction is used that includes an identification code unique to the particular position determination system being used. In the present embodiment, correction program 603 is activated upon receiving a serial number assigned to the position determination system.

Referring now to steps 702–704 of FIG. 7, upon receiving an activation instruction, position is accurately determined using the received encrypted correction data as shown by step 704. That is, the activation instruction engages the position determination system to accurately determine position using the encrypted correction data signals. In one embodiment, differential global positioning system position determination methods are used for determining position. Alternatively, position is determined using real time kinematics position determination methods. In the present embodiment position determination data from satellites of the US global positioning system are used for determining position.

In the embodiment shown in FIG. 6, upon receiving an activation instruction that includes the serial number of position determination system 600, correction program 603 couples decrypted correction data to receiver 601. The decrypted correction data is then used by receiver 601 for accurately determining position.

Although the methods and apparatus of the present invention are described with reference to the use of GPS signals for determining position, it will be appreciated that the teachings are equally applicable to positioning systems that utilize other types of signals and other types of carriers. The methods and apparatus of the present invention can be implemented using pseudolites or a combination of pseudolites and satellites. Pseudolites are ground-based transmitters that broadcast a Pseudo Random Noise (PRN) code (similar to a GPS signal) modulated on an L-band carrier signal, generally synchronized with GPS time. Typically, each transmitter is assigned a unique PRN code so as to permit identification by a remote receiver. The term "GPS", as used herein, is intended to include pseudolite or equivalents of pseudolites, and the term "GPS signals" and "GPS navigation data", as used herein, is intended to include GPS-like signals and data from pseudolites or equivalents of pseudolites.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for generating signals that can be used for accurately determining position comprising:
   a.) generating correction data, said correction data comprising code phase correction data or carrier phase observable data;
   b.) modulating said correction data to a designated frequency so as to produce a first signal;
   c.) generating second signal at a radio station;
   d.) coupling said first signal and said second signal to a diplexer;
   e.) diplexing said first signal and said second signal; and
   f.) coupling said diplexed first signal and said diplexed second signal to an antenna of said radio station such that said diplexed first signal and said diplexed second signal are transmitted from said antenna.

2. The method for generating signals that can be used for accurately determining position of claim 1 wherein said radio station is an existing AM radio station.

3. The method for generating signals that can be used for accurately determining position of claim 1 wherein said first signal is modulated to a frequency of approximately 300 kilohertz.

4. The method for generating signals that can be used for accurately determining position of claim 1 wherein said first signal is modulated to a frequency from 200 kilohertz to 400 kilohertz.

5. The method for generating signals that can be used for accurately determining position of claim 1 wherein said first signal is transmitted at a power level of 1 kilowatt.

6. The method for generating signals that can be used for accurately determining position of claim 1 wherein said correction data is encrypted.

7. The method for generating signals that can be used for accurately determining position of claim 1 wherein step a) further comprises
   a1) receiving position determining signals;
   a2) determining the position indicated by said received position determining signals; and
   a3) determining correction data using said determined position indicated by said received position determining signals and using the actual position of said radio station.

8. The method for generating signals that can be used for accurately determining position of claim 1 wherein step a) further includes the steps of:
   a1) receiving position determination signals; and
   a2) wherein said correction data includes carrier phase observable data obtained from said received position determining signals.

9. An apparatus for generating signals that can be used for accurately determining position comprising:
   a) a beacon signal generator for generating a first signal that includes correction data, said correction data comprising code phase correction data or carrier phase observable data; and
   b) a diplexer coupled to said beacon signal generator and adapted to be coupled to a radio signal transmitter that generates a second signal, said diplexer adapted to be coupled to an antenna for transmitting said first signal and said second signal.

10. The apparatus of claim 9 wherein said beacon signal generator generates correction data that is encrypted, said beacon signal generator adapted to generate an activation instruction and include said activation instruction in said first signal, said activation instruction for indicating to a position determining system that said encrypted correction data is to be used for accurately determining position.

11. The apparatus of claim 10 wherein said first signal is modulated to a frequency of approximately 300 kHz.

12. The apparatus of claim 10 wherein said first signal is modulated to a frequency from 200 kHz to 400 KHz.

13. The apparatus of claim 9 wherein said first signal is transmitted at a power level of 1 kilowatt.

14. The apparatus of claim 9 wherein said beacon signal generator further includes:
   a receiver for receiving position determination signals;
   input means for receiving user input; and
   a controller coupled to said receiver and coupled to said input means.

15. The apparatus of claim 14 wherein said beacon signal generator further comprises:
   a transmitter operable to generate a signal in the 300 kilohertz band; and
   an antenna tuning unit coupled to said transmitter.

16. A method for accurately determining position comprising:
   a) providing a position determination system that includes a receiver adapted to receive position determination signals and that includes a radio for receiving encrypted correction data;
   b) determining position without using said encrypted correction data when no encrypted correction data signal is being received;

c) determining position without using said encrypted correction data when an encrypted correction data signal is being received and when an activation instruction has not been received; and d) accurately determining position using said encrypted correction data when an encrypted correction data signal is received that includes an activation instruction.

17. The method for accurately determining position of claim 16 wherein the position determined in step d) is determined using differential global positioning system position determination methods.

18. The method for accurately determining position of claim 16 wherein the position determined in step d) is determined using real time kinematics position determination methods.

19. The method for accurately determining position of claim 16 wherein said activation instruction includes an identification code unique to said position determination system.

20. The method for accurately determining position of claim 16 wherein said radio receiver receives transmissions in the 300 kHz band.

21. The method for accurately determining position of claim 16 wherein said position determination system receives position determining signals from satellites of the US global positioning system.

22. A position determination system comprising:

a) a receiver adapted to receive position determination signals;

b) a radio adapted to receive encrypted correction data signals, and c) a correction program coupled to said receiver and coupled to said radio, said correction program adapted to accurately determine position using said position determination signals and said encrypted correction data signals upon receiving an activation instruction included in said encrypted correction data signal.

23. The position determination system of claim 22 wherein said receiver determines position without using said encrypted correction data when no encrypted correction data signal is being received, said receiver determining position without using said encrypted correction data when an encrypted correction data signal is being received and when an activation instruction has not been received, said correction program operable upon receiving an encrypted correction data signal that includes an activation instruction such that position is accurately determined using said encrypted correction data.

24. The position determination system of claim 23 wherein said receiver is adapted to receive position determination signals from satellites of the US GPS.

25. A method for charging users for use of correction data comprising the steps of:

a) broadcasting a radio signal that includes correction data that is encrypted;

b) providing a position determination system that includes a radio for receiving said radio signal, said position determination system adapted to decrypt said encrypted correction data; and c) including an activation instruction in said radio signal upon payment by a user for use of said correction data, said activation instruction instructing said position determination system to accurately determine position using said encrypted correction data.

26. The method for charging users for use of correction data of claim 25 further comprising the steps of:

d) allowing a user to use said correction data as long as said user pays for such use; and e) including a deactivation instruction in said radio signal to instruct said position determination system to discontinue accurately determining position using said encrypted correction data.

27. An apparatus for generating signals that can be used for accurately determining position comprising:

a) a beacon signal generator for generating a first signal that includes correction data;

b) a diplexer coupled to said beacon signal generator and adapted to be coupled to a radio signal transmitter that generates a second signal, said diplexer adapted to be coupled to an antenna for transmitting said first signal and said second signal; and wherein said beacon signal generator generates correction data that is encrypted, said beacon signal generator adapted to generate an activation instruction and include aid activation instruction in said first signal, said activation instruction for indicating to a position determining system that said encrypted correction data is to be used for accurately determining position.

28. The apparatus of claim 27 wherein said first signal is modulated to a frequency of approximately 300 kHz.

29. The apparatus of claim 27 wherein said first signal is modulated to a frequency from 200 kHz to 400 kHz.

\* \* \* \* \*